United States Patent [19]

Cottell

[11] 4,326,855
[45] Apr. 27, 1982

[54] PROCESS FOR BENEFICIATING AND STABILIZING COAL/OIL/WATER FUELS

[76] Inventor: Eric C. Cottell, Private Rd., Bayville, N.Y. 11709

[21] Appl. No.: 118,032

[22] PCT Filed: Nov. 8, 1979

[86] PCT No.: PCT/US79/00988

§ 371 Date: Nov. 8, 1979

§ 102(e) Date: Nov. 8, 1979

[51] Int. Cl.³ ............................................ C10L 1/31
[52] U.S. Cl. ........................................ 44/51/; 44/24; 209/5
[58] Field of Search ............... 44/1 R, 51, 24; 209/5; 241/20, 24

[56] References Cited

U.S. PATENT DOCUMENTS

| | | | |
|---|---|---|---|
| 3,268,071 | 8/1966 | Puddington et al. | 209/5 |
| 3,941,552 | 3/1976 | Cottell | 431/2 |
| 4,003,737 | 1/1977 | Caswell et al. | 209/5 X |
| 4,126,426 | 11/1978 | Verschuur | 44/24 |
| 4,156,593 | 5/1979 | Tarpley, Jr. | 44/1 R |
| 4,175,035 | 11/1979 | Moyer, Jr. | 209/5 |

Primary Examiner—Carl F. Dees

[57] ABSTRACT

A coal slurry containing 10–60% solids by weight is optionally first coarsely ground to about 20–80 mesh. Contaminant matter released thereby, may be separated by conventional means such as froth flotation which would eliminate a large proportion of the ash which is energy consuming as well as abrasive in nature. The "clean slurry" would now have water added back and would be further ground to about 100–300 mesh particle size and would then be cavitated by sonic energy making the particle size even smaller and freeing any remaining contaminants including iron pyrites and ash. To this, a mixture of oil is added and the coal, oil mixture is then sonified during which process spherical agglomeration of the coal and oil occurs. The agglomerate and water mixture is screened to separate out most of the water leaving behind about 10–40% water in the coal, during which process the contaminants are also discharged with the water. The spherical agglomerates are mixed with a balance of oil to about 0.6 times the weight of the coal to produce a stable thixatropic fuel with excellent pipe travel characteristics due to a migration of a thin film of water to the boundry layer between the bore of the pipe and the fuel. The process including the sonification steps is also useful generally in the separation of solids by agglomeration.

4 Claims, 1 Drawing Figure

PROCESS FOR BENEFICIATING AND STABILIZING COAL/OIL/WATER FUELS

BACKGROUND OF THE INVENTION

In U.S. Pat. No. 3,941,552 there is disclosed a process in which a mixture of water/oil/coal is subjected to intense sonic agitation which shall be referred to in this specification as "sonification" sufficient to cause cavitation to thereby stabilize the mixture which can then be stored or piped and utilized as a fuel.

In co-pending application Ser. No. 194,117 filed Oct. 6, 1980, a continuation of application Ser. No. 915,854 filed June 15, 1978 and now abandoned, there is disclosed a method of beneficiating coal by mixing the same in particulate form with water and sonifying the mixture to reduce the size of the coal particles by, it is hypothesized the bombardment to which the particles are subjected because of the cavitation. During that process, the pyrites and ash are loosened from the coal particles and in the process of the application are separated out with the water.

In practicing the invention of U.S. Pat. No. 3,941,552, it sometimes occurred that the final product appeared grayish and exhibited an apparent instability in that the aqueous phase or, at least part of it appeared to be separating from the mixture.

While very careful proportioning of the water/oil/coal constituents of the mixture would eliminate this apparent instability, it was not always possible in a continuous on-the-line production of the fuel to take such care, particularly if it was desired to change the sequence of mixing the constituents.

What had been occurring however, in the apparently separated fuel product, was that the coal and oil being naturally lyophobic or repellent to water, the oil acted as a bridging agent to wet the coal, and when the mixture was subjected to agitation, the oil and coal tended to agglomerate and to reject the water. Inasmuch as the water/coal/oil mixture had been sonified, it was determined that when the water was separated out from the agglomerated mass, it contained a great deal of ash.

The separating out of the ash from the mixture is of course desirable and with the experience just discussed, it was decided to modify the process to beneficiate the coal particulate and to include coarse grinding followed by froth flotation or other separation method, followed by wet grinding to a small uniform size, followed by sonification followed by an agglomeration step to rid the mixture of ash and water before finalizing the product.

It also became clear that if properly modified, the process which would include sonification at various stages, to enhance the reduction of particle size and the beneficiation of coal and the agglomeration of the materials, might also be used in a much wider application of separating solids from liquid suspending media by sonification and agglomeration.

A process for separating solids by agglomeration is disclosed in U.S. Pat. No. 3,268,071 which issued Aug. 23, 1966. That process is one for the agglomeration and separation of mixtures of two different physically separate particulate solids comprising minerals and metals for instance, from an aqueous suspendant liquid, one of the solids being hydrophobic and the second one of the solids being hydrophilic to the suspendant liquid. A bridging liquid is added to the mixture in the suspendant liquid, which bridging liquid preferentially wets only the hydrophobic solids to form a film over the wetted hydrophobic solids. The resulting mixture is then subjected to mechanical agitation and turbulent conditions to flocculate the wetted hydrophobic solids and to compact the resulting flocculates into spherical agglomerates of greater density then that of the suspendant liquid. The agglomerates are then separated from the remaining suspension by screening.

In Canadian Pat. No. 1,020,880 which issued on Nov. 15, 1977, "micro agglomeration" is used as a method for displacing the liquid suspendant of a mixture of particulate material and liquid suspendant. That method includes the provision of a mixture containing particles having surfaces which in part are resistant to wetting by an agglomerating liquid and included adding to such a mixture, to displace a substantial amount of the liquid suspendant therefrom, the agglomerating liquid at a specified ratio to the solids in the mixture, then agitating the mixture containing the agglomerating liquid in a mixing device until the particulate material is micro agglomerated from the liquid suspendant.

In Canadian Pat. No. 1,039,059 which issued Aug. 26, 1978, a method of separating inorganic material from coal is disclosed comprising providing the coal containing the inorganic materials in particulate form, as a suspension with a liquid hydrocarbon oil, mixing an aqueous agglomerating liquid which is immiscible with the liquid hydrocarbon oil with the suspension, mixing a particulate material having a hydrophilic surface with the suspension, agitating the suspension with the aqueous agglomerating liquid and particulate material having a hydrophilic surface mixed therewith, to agglomerate inorganic particulate materials in the suspension with the aid of the particulate material having a hydrophilic surface, while leaving at least a major portion of the particulate coal dispersed in the liquid hydrocarbon oil, and then separating the inorganic material from at least a major portion of the liquid hydrocarbon oil and pulverized coal.

In these various prior art publications, just discussed, the usual suspendant liquid is water and the bridging or wetting liquid is an organic liquid preferably insoluble in water, and preferably having high interfacial surface tension between it and the suspendant liquid. Typical bridging agents are benzene, and aliphatic hydrocarbon solvent, such as "varsol", kerosene, petroleum lubricating oil, liquid chlorinated biphenyl, fuel oil and combinations of these. Of course the suspendant liquid may comprise an organic liquid in which case water would be the preferred bridging agent although glycol, formamide phenol, hydroxylated organic liquids and other liquids which are substantially insoluble in the suspending medium, are also suggested.

It is noted that in the prior art methods, the suspendant, the particulate matter to be agglomerated and the agglomerating liquid are mixed and that mixture is agitated until agglomeration occurs after which the suspendant liquid is separated out.

THE INVENTION

The present invention contemplates an optional first step of coarsed grind followed by separation of the major contaminants, followed by wet grinding followed by pre-sonification of the suspendant liquid and the particulate material to reduce the size of the particulate material and in case of coal, to beneficiate the same by releasing from the coal particles, particles of ash and other impurities. A minimal amount of the agglomerating liquid may then be added to the sonified slurry and this mixture is then agitated preferably by sonification sufficient to induce cavitation in the mixture. It has been found that with sonification in the agglomeration step, less agglomerating liquid is required. After sonified agitation, the mixture may then be screened to separate out the suspendant liquid. Further bridging liquid may then be added to produce the final product.

As a first optional step in practicing the present invention, the run of the mine coal is coarsely ground to between 20 and 60 mesh, sufficient to release most of the contaminants. Water is then added to make a slurry of about 10 to 60% by weight of water and the mixture is subjected to a conventional separating process such as froth flotation to remove the bulk of the contaminants. This means that less energy is used to grind the coal properly and the grinding equipment is subject to less wear since the abrasive particles are removed. Additionally by treating this "coarse" grind there is virtually no loss of small particles which are not good candidates for conventional separating methods in a liquid medium but are good candidates for the agglomeration process described herein.

In the process as it applies to the manufacture of coal/oil/water fuels, where the desired end product comprises 50% by weight coal, between 30% and 40% by weight of oil and between 10% and 20% by weight of water, the present process consists of first mixing a slurry of coal particulate and water the coal being approximately ⅓ the weight of the aqueous mixture. That mixture is then sonified to break the ash and pyrites from the coal and oil as the bridging liquid is added. Sonification of this mixture causes the coal and oil to agglomerate. This mixture is screened to separate out the ash and water from the agglomerated mass. Oil is then added to the agglomerated mass, which still retains some water, to the extent desired for the final product.

Depending upon the percentage of water in the agglomerated coal, final sonification or irradiation as it is also called, of the fuel with treatment by cavitation will cause some free water to be leached out of the complete mixture and it has been found that the water content tends to migrate to the outside of the mixture. In other words if the mixture is being conveyed through a pipe there is a layer of water between the mixture and the bore of the pipe which facilitates the passage of this thixotropic liquid through the pipe.

The amount of water left in the agglomerated coal can be carefully controlled by the amount and type of oil which is introduced in the spherical agglomeration process just after the coal/water mixture has been irradiated and when the mixture is about to be further irradiated after the introduction of the oil as the agglomerating medium.

It has been noted that the requirement in terms of quantity of oil in the mixture for agglomeration is less when irradiation is used than in the processes described in the prior art in which 30% by weight of oil and more is used in the agglomeration steps. In the processes to be described herein, less than 10% oil by weight appears to be satisfactory. The advantage of course is that the less oil used in the agglomeration step, the less expensive the process is. Additionally, in sonic irradiation, the percentage of solids in the liquid can be much higher, thus the advantage in the use of sonification in the process.

Figure 1:
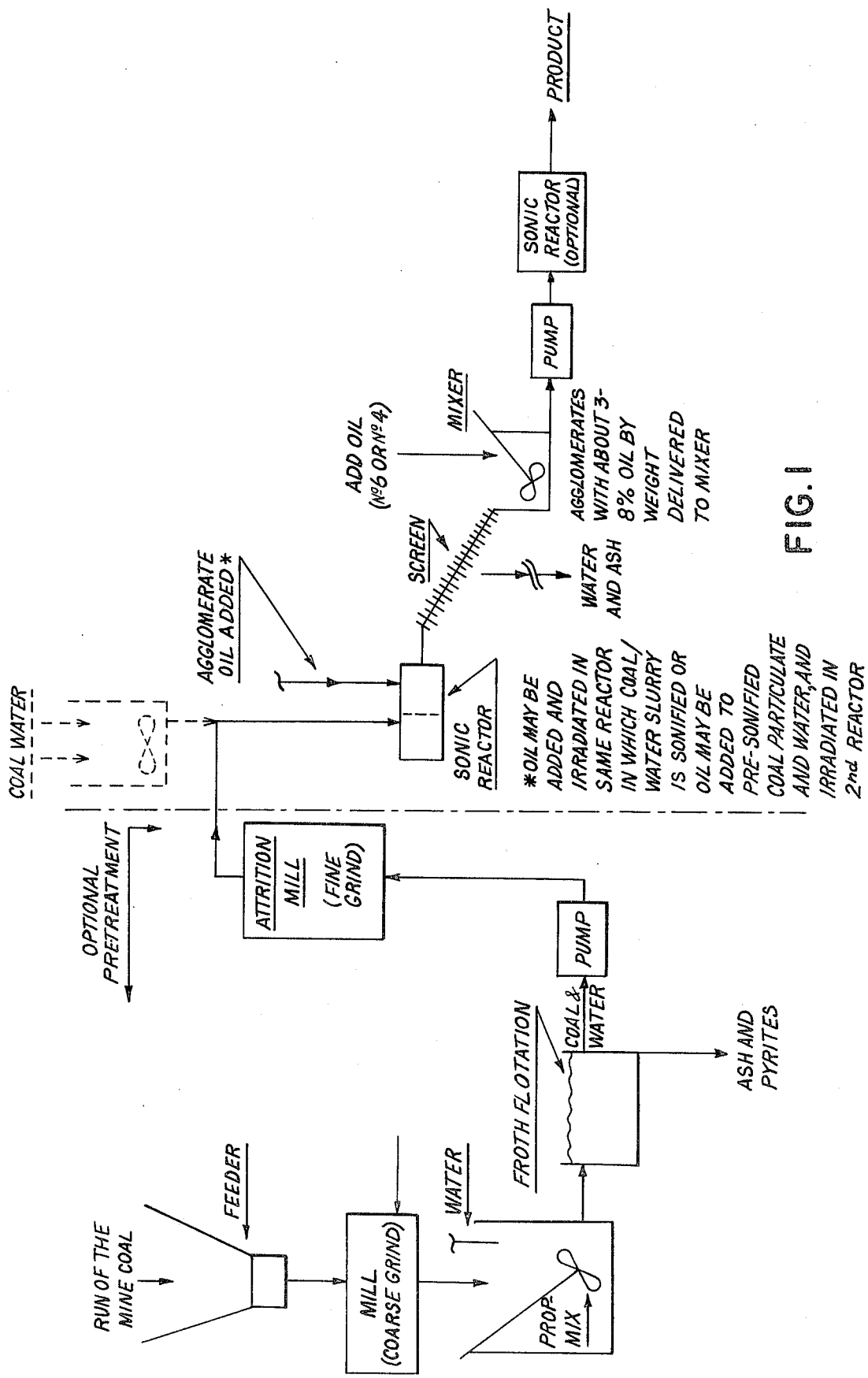
FIG. 1 is a flow diagram of the process of the invention.

While the invention will be discussed mainly with a relation to the production of coal/oil/water mixtures for fuels, it will be appreciated that utilization of sonification in conjunction with spherical agglomeration is not limited to coal/oil/water mixtures but is useful with spherical agglomeration for many separating operations as for instance those discussed in the prior art; i.e. the separation of solids from their suspendant liquid by the addition of a bridging liquid so that the lyophobic particles separate from the suspension after agglomeration. It is noted that if water is the suspendant liquid then an organic liquid preferably insoluble in water would be the bridging liquid and visa-versa. The object is that the bridging liquid will agglomerate with the solid in the suspendant liquid after which the suspendant liquid and the agglomerated mass can be separated.

It is within the purview of this invention to sonify the initial mixture of the suspendant liquid and solids and then to again utilize sonification after the agglomerating medium is added and then preferably to again sonify any later mixture of the agglomerated mass with more agglomerating medium, for instance.

Specifically and with reference to FIG. 1, the invention has been carried out in the production of coal/oil/water fuels.

The coal may first be coarsely ground and water is added and initial separation of contaminants with the water is carried out by froth flotation, although other conventional separation methods may be used. The "clean" coal/water slurry is then subjected to a grinding operation to grind the coal to between 100 to 300 mesh.

If this first step is optionally not carried out, the suspendant liquid, water in this instance may be fed from a water supply into a container and mixed with coal in particulate form preferably with a typical particle size of 50 to 100 microns or less, although larger particle sizes to 200 microns or more may be used. The mixture preferably comprises 60% by weight of water and 40% by weight of coal. The mixture may be stirred by a propeller shown in phantom within the container in FIG. 1 and at any rate the slurry is pumped to an ultrasonic reactor of the type disclosed in U.S. Pat. No. 3,941,552 and in U.S. Pat. Nos. 3,715,104 and 3,749,318. Now the slurry is subjected to sonification, that is to violent sonic agitation with an intensity sufficient to cause cavitation and for a time sufficient to reduce the particle size of the coal particulate even further as a result of the pyrites including ash breaking away from the coal. To this slurry, the agglomerating medium may be added but in the preferred "on line" process, the slurry is pumped to a container where a relatively small amount of the agglomerating medium, in this instance between 1% and 3% by weight of the coal is added to the slurry. The slurry with the agglomerating medium is then agitated and according to the invention, preferably sonified again with sufficient intensity to cause cavitation.

The agglomeration step is very much enhanced by the use of sonification that is it is quicker and less agglomerating medium has to be used than if agitation of less intensity is applied to the mixture.

The resultant mixture after sonification of the water/coal slurry and agglomerating oil medium comprises the agglomerated mass of coal and oil and a mixture of water and ash which is lyophilic to the agglomerating medium but not to water. The mixture is then screened so that the water and ash are screened out and the agglomerated mass of coal and oil is recovered.

The screened out water/ash may be brought back upstream through a separating step where the ash and water are separated and the water returned to the water supply to the initial container.

In fact, however, the agglomerated mass also contains a small amount of water which is quite acceptable to the desirable qualities of the final product sought in this process, i.e. a coal/oil/water fuel with between 10%-20% by weight of water. To the agglomerated mass is added oil sufficient to produce a blended coal/oil/water product consisting of 50% by weight of coal between 30% and 40% by weight of oil and between 10% and 20% by weight of water. The coal/oil/water mixture may then be agitated or sonified again and then may be stored piped or used as a fuel. Sonification at this point in the process tends to separate out the water which tends to migrate to the outside of the mass to thus enhance pipe travel characteristics of the fuel.

There have been many experiments conducted in the laboratory involving the proportions of the constituent elements to be used in the above described process. Furthermore, experimentation has been carried out utilizing number 2 oil and number 6 oil both in the agglomerating and finalizing steps or in series (number 2 is one and number 6 is the other) with varying results in the end product as concerns viscosity and thixotropy.

In one experiment it was the object to determine whether spherical agglomeration would occur utilizing a number 2 oil in the agglomerating step. In that example 100 grams of coal having a particle size of approximately 70 microns was mixed with 200 grams of water in a blender. The resultant slurry was irradiated; i.e. sonified. To the resultant irradiated slurry first two grams of number 2 oil were added and the mixture was then irradiated. Agglomeration did not appear to occur. Two more grams of number 2 oil were added and the resultant mixture was again irradiated. No spherical agglomeration appeared to occur. Finally two further grams, six in all, of number 2 oil were added and the resultant mixture was irradiated and spherical agglomeration did occur. This mixture was passed through a sieve, where the water and ash which had been separated from the coal, was separated out. To the agglomerated mass 40 grams of number 6 oil were added and the mixture was agitated. The resultant end product exhibited good thixotropic properties.

What is claimed is:

1. The process for producing fuel comprising making a slurry of coal particulate and water, sonifying the slurry with sufficient intensity to cause cavitation, adding oil to the sonified slurry to thereby cause spherical agglomeration of the oil and coal portions of the mixture, sonifying the slurry and oil mixture to enhance the spherical agglomeration process, screening out the water and any nonagglomerated particles from the coal particulate and adding oil to the agglomerate mass to form a stable fuel.

2. The process of claim 1 in which the agglomerate mass and oil mixture is sonified.

3. The process of claim 1 wherein run of the mine coal is first coarsely ground to 20 to 60 mesh to release contaminants therefrom, water is added to form a slurry and the slurry is subjected to a separation process in which water and contaminants are separated from the coal particulate, water is added to the particulate and this slurry is subjected to further grinding to bring the particulate size down to about 100-300 mesh, then the slurry is sonified in accordance with the process of claim 1.

4. A process for separating solids and for agglomerating other solids in suspendant and bridging liquids comprising adding particulate material to a suspendant liquid, the particulate material having parts thereof which are lyophobic to the bridging liquid and parts thereof which are lyophilic to the bridging liquid, sonifying the mixture to thereby cause the lyophobic and lyophilic parts to break away from one another within the suspendant liquid, adding a bridging liquid to the sonified mixture and then sonifying the mixture with the bridging liquid in it with sufficient energy to cause cavitation to agglomerate the bridging liquid and lyophilic particles, separating out the suspendant liquid and the lyophobic particles, adding oil to the agglomerated mixture after the suspendant liquid and the lyophobic particles have been separated out, and sonifying this final mixture.

* * * * *